July 1, 1930.  C. P. WEST  1,768,811
MOTOR STARTING SYSTEM
Filed Feb. 27, 1928
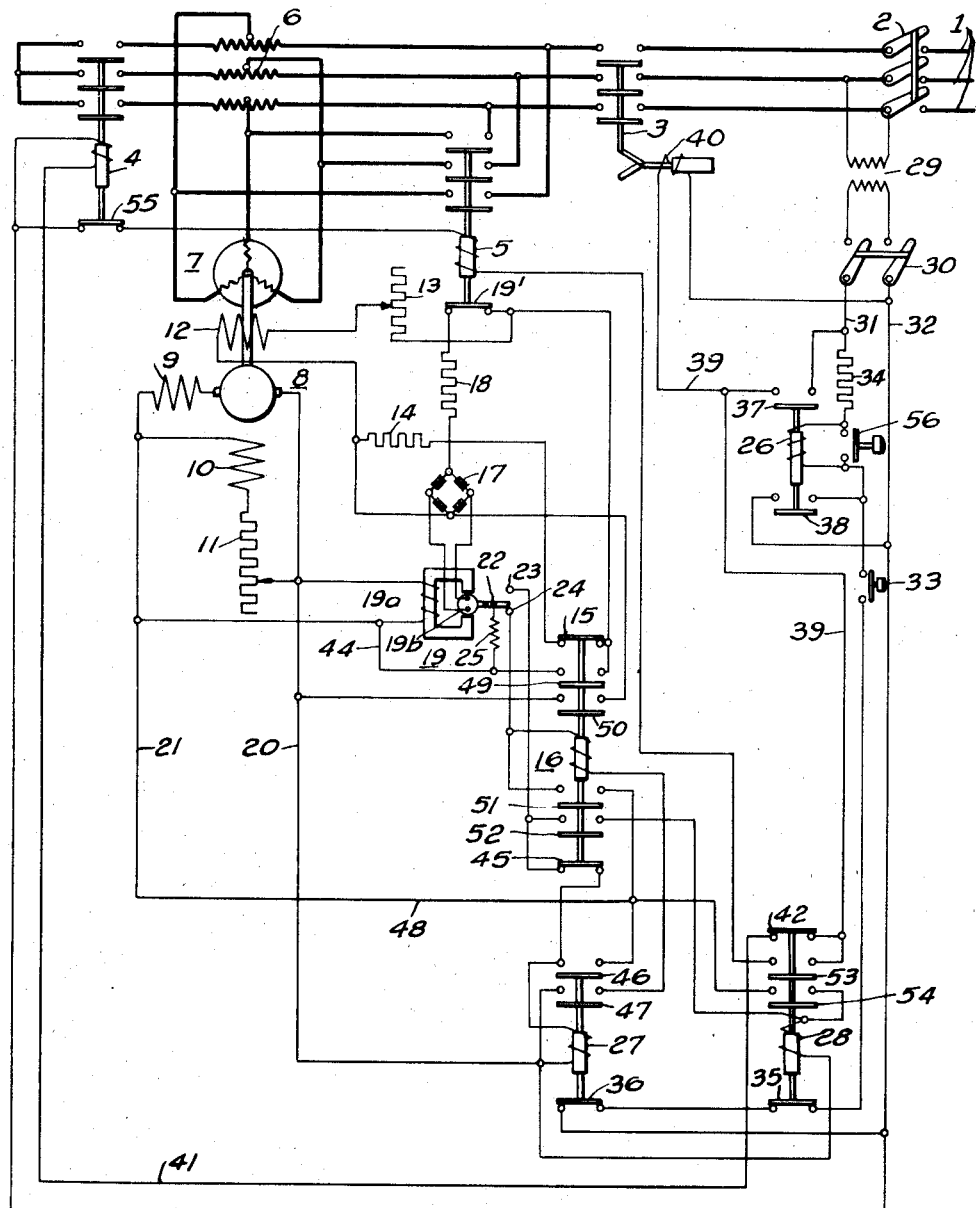
INVENTOR
*Charles P. West.*
BY
*Chesley S. Carr*
ATTORNEY Patented July 1, 1930

1,768,811

UNITED STATES PATENT OFFICE

CHARLES P. WEST, OF PITTSBURGH, PENNSYLVANIA, ASSIGNOR TO WESTINGHOUSE ELECTRIC & MANUFACTURING COMPANY, A CORPORATION OF PENNSYLVANIA

MOTOR-STARTING SYSTEM

Application filed February 27, 1928. Serial No. 257,138.

This invention pertains to automatic starting systems for electric motors and more particularly to systems of the type adapted to control the starting of synchronous motors having direct-current generators directly connected thereto.

One of the objects of my invention is to provide a starting system for synchronous motors, whereby the motor field circuit is closed through a resistor during the first portion of the starting period and connected to a source of excitation when the motor reaches substantially synchronous speed.

Another object of my invention is to provide a system for starting synchronous motors in which the transfer from starting to running voltage is dependent upon the voltage generated by a direct-connected generator.

A further object of my invention is to arrange a starting system for synchronous motors in which a direct-current relay is energized in proportion to the current induced in the field circuit, during starting, to control the connection of a source of excitation thereto, and by the voltage of said source of excitation to control the transfer of the motor armature from starting to running connections.

In accordance with my invention, I provide a field relay having contacts adapted to close the circuit of the motor field winding through a resistor when the system is de-energized, and to connect the field winding to a direct-connected exciter when the field relay is energized. The operation of the field relay is controlled by a direct-current relay which obtains its energizing current from a rectifier connected in parallel with the resistor connecetd in the field circuit while the field relay is de-energized.

This second-mentioned relay is subsequently connected so that it is energized by the voltage generated by the direct-connected exciter generator to control the transfer of the motor armature from starting to running connections when the voltage generated by the exciter reaches a predetermined value.

For a complete understanding of my invention, reference is made to the accompanying drawings in which:

The single figure of the drawing is a diagram of the complete circuit of the starting system of my invention.

Referring to the drawing, the starting system of my invention comprises a source of alternating current 1, the connection of which to the motor is controlled by a disconnect switch 2, a main oil circuit breaker 3, and a starting contactor 4 and a running contactor 5.

Auto-transformers 6 are employed to provide a source of reduced voltage for starting the motor which is illustrated at 7. Directly connected to the shaft of the motor armature is a direct-current exciter generator 8 having a series field winding 9 and a shunt field winding 10, the circuit of which includes a rheostat 11.

The field winding of the motor is illustrated at 12 and its circuit includes a rheostat 13. When the starting circuit is de-energized obviously all of the control devices are likewise de-energized, and the circuit of the field winding 12 is closed through a resistor 14 and a back contact 15 of a relay 16 for controlling the circuit of the field winding.

Connected in parallel with the resistor 14 and the back contact 15 is a circuit including a rectifier bridge 17, a current-limiting resistor 18 and a back contact 19' on the running contactor 5. The rectifier bridge 17 is preferably arranged to be a full-wave rectifier and may be of the copper-oxide-disc type, such as is disclosed in the United States Patent No. 1,640,335 to Grondahl, granted August 23, 1927, but obviously any other suitable type of rectifier may be substituted.

Connected to the direct-current terminals of the rectifier 17 is the moving coil $19^b$ of a direct-current relay 19. This relay comprises a magnetic circuit which may be either that of a permanent magnet or an electromagnet having its winding $19^a$ connected to any convenient source of direct current such as buses 20 and 21 of the exciter generator 8. The relay 19 has two fixed contacts 23 and 24, and a movable contact 22 which is biased to engagement with the contact 24 by a spring 25. The contact 22 is permanently connected to the exciter bus 21. The relay 19 functions in a manner to be hereinafter described, to control the starting system of my invention.

In addition to the relay 19, the field relay 16 and the starting and running contactors, I also provide a starting relay 26, an auxiliary field relay 27, and a transition relay 28, the details of which will be more fully described in connection with the description of the operation of my system which will now be given.

Assuming the disconnect switch 2 to have been closed, the primary winding of a control-energy transformer 29 which is connected across one phase of the supply, is energized. A switch 30 is provided to connect the alternating-current control buses 31 and 32 to the secondary of the transformer 29. The operations already mentioned need not be repeated at each starting of the motor, but when once effected will always maintain the system in condition to be started in a manner about to be described.

The motor is actually started by means of a switch 33 which, although illustrated as a push-button switch, may also be an automatic or remotely-controlled switch. The closing of the switch 33 completes a circuit from the control bus 31 through a resistor 34, the operating coil of relay 26, switch 33, back contact 35 of relay 28, back contact 36 of the relay 27 and thence to the control bus 32.

The completion of this circuit causes the operation of the starting relay 26 which thereupon closes its contacts 37 and 38. The closing of the contact 38 completes a circuit from the lower terminal of the operating coil of relay 26 to the bus 32 in parallel with the contacts 35, 33 and 36, so that the relay 26 remains energized and its contacts closed until its coil is de-energized, as by being short-circuited, as will be hereinafter explained.

The closing of the contact 37 energizes an auxiliary control bus 39 to which is connected the operating coil 40 of the oil circuit breaker 3. This circuit breaker is thereupon closed to connect the auto-transformers 6 to the source 1.

The energization of the auxiliary bus 39 also results in the operation of the starting contactor 4, the operating coil of which is connected by means of conductor 41 and back contact 42 of relay 28 to the auxiliary control bus 39 and by means of conductor 43 to the control bus 32.

The operation of the starting contactor 4 connects the auto-transformers in star and applies a reduced voltage to the armature winding of the motor 7 which thereupon starts to rotate in a well known manner.

As previously explained, the field circuit of the motor is closed at the beginning of a starting period through the resistor 14 and the contact 15 of the relay 16. When reduced voltage is applied to the motor armature, an alternating current is induced in the closed field circuit and a portion of this current passes through the branch of the circuit including the resistor 18 and the rectifier 17. This portion of the current is rectified and direct current proportional thereto passes through the winding of the moving element of the relay 19.

Connections to the relay 19 are so made that when the moving element thereof is energized by current from the rectifier, the contact 22 is moved into engagement with the contact 23.

Upon starting, the current induced in the closed circuit of the motor field is obviously of considerable magnitude, depending upon the value of the resistor 14, and the direct current from the rectifier 17 operates the relay 19 to complete a circuit to the operating coil of the auxiliary field relay 27 which is as follows: from the direct-current bus 21, the conductor 44, contact 22, contact 23, back contact 45 of the relay 16, operating coil of the relay 27 and thence to the control bus 20. The current induced in the motor field maintains the contacts 22 and 23 engaged until the voltage developed by the exciter generator is sufficient to operate the relay 27.

Upon the energization of the operating coil of the relay 27, its contacts 46 and 47 are closed and contact 36 is opened. The opening of the contact 36 does not affect the remainder of the system since it is already shunted by contact 38 of the relay 26. The closing of the contact 46 completes a locking circuit for the operating coil of relay 27 by connecting the latter to the conductor 48.

The closing of the contact 47 sets up a circuit from the bus 20 through the contact 47, the operating coil of the field relay 16, contact 24, contact 22, conductor 44 and thence to the bus 21. It is obvious that the circuit above traced is not closed until the current induced in the closed circuit of the motor field winding is reduced to a predetermined minimum value at which the torque exerted upon the moving element of the relay 19 by the spring 25 overcomes that exerted by the energization of the winding of the moving element. The spring 25 may be so adjusted, by any suitable means, that the contacts 22 and 24 will be engaged subsequently to the engagement of contact 23 by contact 22, when the current induced in the field winding circuit has been reduced to a small value indicating that the motor is running at substantially synchronous speed.

When this condition obtains, the circuit including the winding of relay 16 is closed, and the relay opens its contacts 15 and 45 and closes contacts 49, 50, 51 and 52. The opening of the contact 15 interrupts the closed circuit through the motor field winding, and the contacts 49 and 50, when closed, connect the field winding to the buses 21 and 20 so that the exciter generator 8 supplies current to the field winding of the motor.

The closing of contact 51 completes a locking circuit for the field relay 16 as follows: from bus 20 through contact 47 of relay 27, the operating coil of relay 16, contact 51 and thence to bus 21 by conductor 48. The closing of the contact 52 sets up a circuit to the operating coil of the transition relay 28, the further operation of which will be described later. The opening of the contact 45 interrupts the circuit by which the relay 27 was initially energized, but does not affect the said relay, since the circuit was shunted by the closing of contact 46.

When the motor field winding is connected to the buses 20 and 21 of the execiter generator, it is apparent that the rectifier 17 is in a circuit connected across the field winding 12 and the rheostat 13, and is, therefore, subject to the terminal voltage of the exciter generator. Under these conditions, the relay 19 will be operated so that contact 22 engages the contact 23 a second time, when the voltage generated by the exciter generator has increased to a predetermind value, as a result of the increase in the speed of the motor. By suitably designing the relay 19 and the other elements in circuit therewith, the second engagement of the contacts 22 and 23 may be effected when the exciter voltage has increased to an optimum value at which transfer from starting to running connections may be made.

When the relay 19 again operates as a result of the increase in the exciter voltage, to cause the engagements of contacts 22 and 23, a circuit is completed from the bus 21 through conductor 44, contacts 22 and 23, contact 52, operating coil of the relay 28 and thence to the bus 20.

Upon the establishment of this circuit, the relay 28 is energized and opens its contacts 42 and 35 and closes the contacts 53 and 54. The opening of the contact 35 is ineffective to alter conditions in any part of the circuit, since it is shunted by contact 38. The opening of the contact 42, however, interrupts the circuit to the operating coil of the starting contactor 4 which thereupon opens its main contacts and closes a back contact 55. The closing of the contact 54 of the relay 28 completes a locking circuit for the relay 28 from the bus 20, through the coil, contact 54 and thence to the conductor 48 and the bus 21. The closing of the contact 53 completes a circuit from the auxiliary bus 39 through contact 53, the operating coil of the running contactor 5 and the back contact 55 on the starting contactor 4 and thence to the control bus 32.

The operating coil of the running contactor 5 being energized, the contactor is actuated to close its main contacts to connect the armature windings of the motor directly to the source 1 through the circuit breaker 3 and the switch 2. Simultaneously, the contact 19' of the running contactor 5 is opened and the rectifier 17 is thereby disconnected from the exciter generator.

When this sequence of operations has been effected, the motor 7 is connected directly to a supply of normal voltage and is running at synchronous speed, ready to assume its load. Under normal running conditions, the oil circuit breaker 3, the running contactor 5, the field relay 16, the auxiliary field relay 27 and the transition relay 28, as well as the starting relay 26, are energized. The starting contactor 4 at the same time is de-energized, as is the relay 19'.

When it is desired to stop the motor 7, it may be accomplished by closing the switch 56, which may be automatically or remotely controlled, although it is shown as a push-button switch adapted to be manually operated. The closing of the switch 56 short circuits the operating coil of the starting relay 26 which thereupon opens its contacts 37 and 38. The auxiliary bus 39 is thereby de-energized and the oil circuit breaker 3 and the running switch 5 are opened as a result of the de-energization of their respective operating coils. The motor 7, being disconnected from its source of supply, decelerates and the voltage generated by the exciter generator 8 decreases. When this voltage has decreased to a predetermined value, the operating coils of the relays 16, 27 and 28 are de-energized so that the entire system is restored to its original condition.

It will be obvious to those skilled in the art that the starting system of my invention involves many advantages over those known heretofore. By starting the motor on reduced voltage with its field circuit closed through a resistor, a high starting torque is obtained. The opening of the field circuit and the connection thereto of a source of excitation, according to my invention, is controlled by a simple direct-current relay responsive to the magnitude of the current traversing the closed field circuit, which is an index of the slip between the rotor of the motor and the rotating field induced in the armature windings, which in turn, is an index of the speed of the motor. By suitable relays and connections, I am enabled to employ the same control relay for causing the motor armature to be transferred from a starting source of reduced voltage to a source of normal voltage, in accordance with the voltage generated by the exciter generator. The use of frequency relays which is necessary in some of the starting systems now known, is obviated by the starting system of my invention.

Although I have shown and described but a single modification of my invention, I am aware that it is susceptible of various changes

I claim as my invention:

1. In a motor starting system for a motor having a field winding, a source of excitation voltage therefor, a relay for controlling the connection of said source of excitation voltage to said motor field winding in accordance with the current induced in the field at starting, and means for connecting said relay to said source when the field is connected thereto, to control the transfer of the motor armature from starting to running connections in accordance with the voltage of said source.

2. In a motor-starting system for a motor having armature and field windings, low-voltage and full-voltage current sources, starting and running contactors for connecting the motor armature to said low-voltage and full-voltage sources, an exciter generator, a field contactor which, when open, closes the motor field circuit upon itself and, when closed, connects the field circuit to said exciter generator, means for closing the starting contactor, means responsive to the initial induced field current and to a subsequent predetermined reduction in said induced field current for effecting a closing operation of the field contactor, said means being rendered effective by the closing of the field contactor for opening the starting contactor and closing the running contactor in response to the attainment by the exciter voltage of a predetermined value.

3. A starting system for a motor having a field winding and a generator for energizing said field winding comprising means for closing the motor field circuit upon itself, means for applying a reduced voltage to the motor armature, means including a relay and a field switch for opening the field circuit and connecting it to said generator when the current induced in the field circuit decreases to a predetermined minimum, said field switch being disposed when operated to render the relay entirely responsive to the voltage of said generator to change the armature connections, whereby the voltage applied to the motor armature is increased to its normal value when the voltage of said generator increases to a predetermined value.

4. A starting system for a synchronous motor comprising a generator, a field switch for closing the motor field circuit upon itself when the system is de-energized, means for starting the motor on reduced voltage, a relay responsive to a predetermined decrease of the induced field current for effecting the operation of the field switch to cause the field circuit to be opened and connected to said generator when the motor has reached substantially synchronous speed, and means for causing a subsequent operation of said relay to effect the transfer of the motor armature from the reduced-voltage starting connection to a running connection of higher voltage when the voltage of the generator has increased to a predetermined value.

5. In a motor-starting system, in combination, a synchronous motor provided with field and armature windings, low and high-voltage power sources for the motor, means for connecting the armature winding to the low-voltage power source to start the motor, means for limiting the flow of induced current in the field winding, an exciter actuated by the motor, a switch operable to connect the exciter to the field winding, means including a relay for effecting the operation of the field switch in response to a closure of the relay in response to the initial flow of induced field current and a subsequent opening of the relay in response to a predetermined decrease in the induced field current, said relay being rendered responsive to the exciter voltage only through the operation of the field switch, and means responsive to a subsequent reclosure of said relay for effecting a reconnection of the motor armature to the high-voltage power source when the exciter voltage increases to a predetermined value.

6. In a motor-starting system, in combination, a motor provided with armature and field windings, a source of power for the motor having a low-voltage starting tap and a high-voltage running tap, means for connecting the armature winding to the starting tap, an exciter disposed to be actuated by the motor, a main field switch operable to connect the exciter to the field winding, said switch when in its open position being disposed to establish a shunt circuit for the motor field winding, an auxiliary field switch for controlling the main field switch, a transfer switch for effecting a reconnection of the motor armature to the high-voltage running tap, a direct-current relay having a plurality of contact-making positions for controlling said switches, means including a rectifier for connecting the relay to the motor field winding, said relay being operable in response to the initial induced field current to effect a closing operation of the auxiliary field switch in response to a predetermined increase in the exciter voltage, said relay being disposed to return to its initial contact-making position to effect a closing operation of the main field switch when the induced field current decreases to a predetermined value, said main field switch being disposed to render the relay responsive to the exciter voltage to effect a closure of the transfer switch when the exciter voltage increases to a predetermined value and the motor is running at substantially synchronous speed.

7. In a motor-starting system, in combination, a motor provided with armature and field windings and a field resistor, a source of power having a low-voltage starting tap and a high-voltage running tap, means for connecting the armature winding to the starting tap, an exciter disposed to be actuated by the motor, a main field switch operable to connect the exciter to the field winding, a circuit for energizing said main field switch from the exciter, an auxiliary field switch for partially controlling the energizing circuit for the main field switch, a circuit for energizing the auxiliary field switch, said main field switch being disposed to establish a shunting circuit through the field resistor for the motor field winding when in its open position, a direct-current relay for controlling said switch-operating circuit, a rectifier bridge for connecting the direct-current relay to the field circuit to be responsive to changes in the induced field current, said relay being responsive to the high induced field current at the time of starting for establishing the energizing circuit for the auxiliary field switch, said auxiliary field switch being actuated in response to a predetermined increase in the exciter voltage to partially complete the energizing circuit for the main field relay, said circuit being finally established through the further operation of the direct-current relay responsive to a predetermined decrease in the induced field current, said relay bridge being connected to the exciter in response to the operation of the field switch, and a transfer switch operable to effect a reconnection of the armature to the high-voltage-running tap in response to the reoperation of the direct-current relay responsive to a further predetermined increase in the exciter voltage.

In testimony whereof, I have hereunto subscribed my name this 23rd day of February, 1928.

CHARLES P. WEST.